Figure 1:
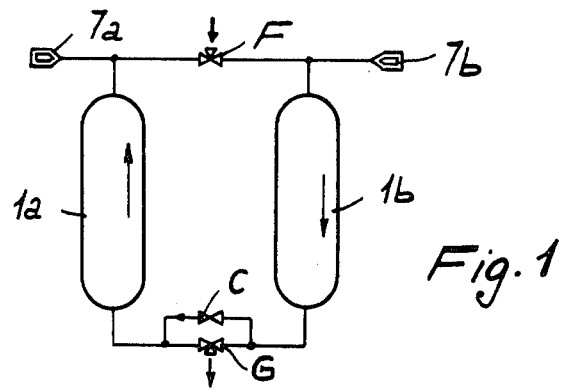

United States Patent [19]

Lattuada

[11] 4,295,863

[45] Oct. 20, 1981

[54] METHOD FOR AUTOMATING AND OPTIMIZING THE OPERATIVE CYCLE IN ADSORPTION DEHYDRATION PLANTS

[75] Inventor: Sergio Lattuada, Bergamo, Italy

[73] Assignee: S.T.I. Strumentazione Industriale S.p.A., Gorle, Italy

[21] Appl. No.: 153,265

[22] Filed: May 27, 1980

[30] Foreign Application Priority Data

Jun. 6, 1979 [IT] Italy ................................ 2912 A/79

[51] Int. Cl.³ ............................................. B01D 53/04
[52] U.S. Cl. ......................................... 55/21; 55/26; 55/33; 55/62
[58] Field of Search .................... 55/20, 21, 25, 26, 62, 55/161–163, 179, 180, 33

[56] References Cited

U.S. PATENT DOCUMENTS

| | | | |
|---|---|---|---|
| 2,621,752 | 12/1952 | Riley | 55/62 X |
| 2,783,547 | 3/1957 | Bieger et al. | 55/162 X |
| 3,160,486 | 12/1964 | Busch, Jr. | 55/162 |
| 3,324,631 | 6/1967 | Kreuter | 55/163 |
| 3,552,096 | 1/1971 | Dayson | 55/163 |
| 3,659,399 | 5/1972 | Kauer, Jr. et al. | 55/62 X |
| 3,902,875 | 9/1975 | Bridigum et al. | 55/162 |
| 4,197,095 | 4/1980 | White, Jr. et al. | 55/21 X |
| 4,222,750 | 9/1980 | Gauthier et al. | 55/62 X |

*Primary Examiner*—Robert H. Spitzer

[57] ABSTRACT

Method for automating and optimizing the phases of the working cycle in adsorption gas dehydration plants of the "heatless" type, having two tanks storing an adsorbing medium and alternating with each other in the regeneration, repressurization, inversion, adsorption and decompression steps. The method according to the invention provides that the repressurization and inversion operations are driven by a single pneumatic pulse of simultaneous control by a programmer providing and removing only one signal at preselected intervals with respect to the servocontrol of an inversion valve, the shutter of which changes over only under the condition of balance between the force or bias of the servocontrol and the differential pressure between the two tanks.

2 Claims, 2 Drawing Figures

METHOD FOR AUTOMATING AND OPTIMIZING THE OPERATIVE CYCLE IN ADSORPTION DEHYDRATION PLANTS

This invention is concerned with a method for automating and optimizing the operative cycle in adsorption dehydration plants with the so-called "heatless" type of regeneration, in which there is provided according to the invention and operative cycle which, inter allia, allows to avoid all of the down times of the passive phases.

As well known, a gas dehydration plant of the above design is comprised of two adsorption tanks, commonly referred to as adsorbers, charged with alumina, silica gel or other adsorbents, in which the adsorbers alternate with each other in performing the function of adsorbing and regenerating the adsorbent medium. That is to say that one of the tanks is adsorbing and the gas to be dried is passed therethrough, while the other tank is regenerating the adsorbent by means of an amount of dry gas (referred to as a purge) which through a feeder is drawn from the same dried gas from the other adsorbing tank. By operation of valves and sensors, the functions of the two tanks are then inverted.

Therefore, the entire cycle of these plants mainly comprises the following steps alternating according to the following sequence:

1—Regeneration.
2—Repressurization.
3—Inversion.
4—Adsorption.
5—Decompression.

The sequence and duration of the several steps are controlled by a suitable programmer. The above mentioned steps may be divided into active steps, such as those numbered 1 and 4, and passive steps, such as those numbered 2, 3 and 5, since the latter make up the intermediate operative steps. Steps 3 and 5 require very short operating times and perform only auxiliary functions while, on the other hand, step 2 or repressurization step requires longer operating times, totalling to about 20–30% of the total cycle, thus constituting the most nonproductive and passive step of the cycle.

Thus, it should be taken into account that the repressurization step is introduced in order to avoid conditions of pressure unbalance at the time of the inversion step, which conditions would cause shakings in the adsorbing bed, with the adverse consequences that can be readily supposed. Therefore, it is necessary to ascertain that before effecting the inversion between the two tanks, the latter are under conditions of approximately pressure balance.

On one hand, there is accordingly the need of having to extend the repressurization step in order to ascertain that a pressure balance will later exist at the time of inversion while, on the other hand, it would be suitable to minimize the passive steps and hence the down times.

Hitherto, in the known plants, a fixed time is assigned for the repressurization step, exceeding the time which would be strictly required, in order to take into account all of the possible disturbing factors and to avoid that the successive inversion step occurs under conditions of pressure unbalance. Of course, this involves the provision of a substantial down time, which is imposed for reasons of safety. Attempts were made to solve this drawback resorting to enabling elements, such as sensors or differential pressure switches, designed to identify the completion of repressurization.

The insertion of these pressure switches or other similar sensors adds to the investment cost of the plant, in addition to rendering it sometime scarcely reliable due to the complexity of the components and also renders uncertain an entirely pneumatic embodiment of the control logic, which instead would be per se desirable, considering the plant structure to which such components are applied.

Thus, it is the object of the present invention to provide a method, which not only simplifies the characteristics of the programmer for the plant operating steps, but allows to avoid all of the down times for all of the passive phases and just as to the repressurization step, reduces the duration thereof, rapidly completing the repressurization at the final step, when the differential pressure between the two adsorbers reaches a predetermined difference in level, and in any case such as not to damage the adsorbing bed.

The object aimed by the present invention is accomplished in that, according to the invention, it is provided that the control sequence of the programming unit for the above shown steps is effected by simultaneously supplying a single control pulse for carrying out the repressurization step and requesting the inversion step without supplying for the latter any further successive control pulse, and accordingly without the need of any other sensors or other device, automatically at the completion of repressurization.

In order to implement such a method, the invention provides the adoption on the plant of two- or three-way valves, generally under pneumatic control, having the particular and main constructive characteristics of having an unbalanced type of shutter, that is not requiring by the servocontrol a strain directly proportional to the differential pressure acting on said shutter (thus excluding the rotating male or ball shutters and the like); having the eventual low friction stuffing box; and having a low friction and reversible pneumatic or electric servocontrol.

The advantages being achieved according to the invention mainly consist as follows:
(a) The characteristics of the programmer are extremely simplified, since the programmer has only to supply and remove a signal at constant intervals defining the cycle duration.
(b) All of the down times are eliminated.
(c) The final repressurization step is accelerated.
(d) The repressurization time is automatically adapted to the available amount of fluid.
(e) Significant functions of safety and clamping are provided without resorting to any special fittings.

The invention will now be further described with reference to the accompanying drawings, given by mere way of unrestrictive example, and in which:

FIG. 1 schematically shows a general "heatless" type of dehydration plant; and

Figure 2:
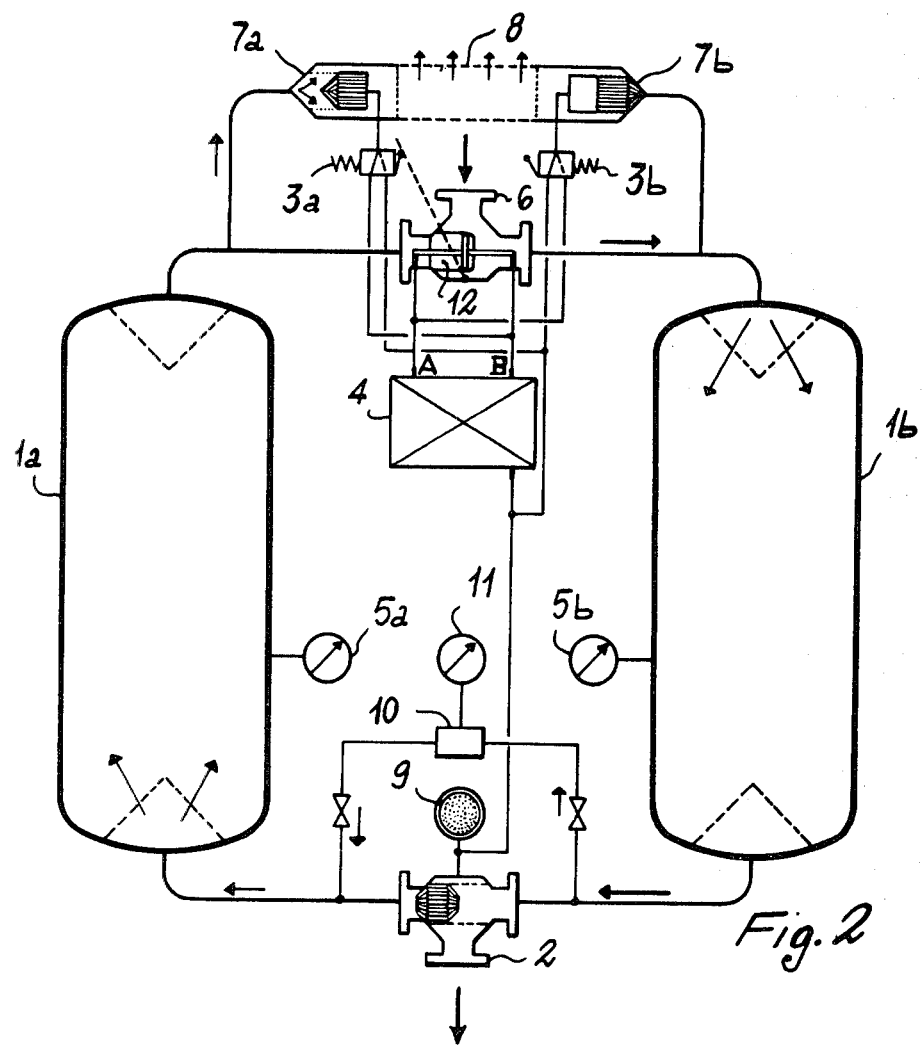

FIG. 2 is a diagram of a dehydration plant operating by the method or process according to the invention.

Referring to FIG. 1, the operation of the involved type of dehydration plant will now be briefly described. As it will be seen, such a plant comprises two tanks, designated by 1a and 1b respectively, each of which charged with alumina, silica gel or other adsorbents. Tank 1a is at regenerating step, whereas tank 1b is at adsorbing step. By means of an amount of dry gas (purge) the regeneration of tank 1a is just effected drawing such an amount through a feeder C, then venting such a gas to atmosphere through the open valve 7a. At the end of the adsorbing step, closing of valve 7a provides for repressurizing the adsorber 1a, which was at regenerating step and which therefore is brought to same pressure as tank or adsorber 1b. Then the inversion of the two valves F and G changes over the functions of the two adsorbers, and namely adsorber 1a is at adsorbing step, while adsorber 1b is decompressed by opening of valve 7b and brought to atmospheric regeneration. Thus, the steps previously shown in the present description will occur.

Referring now to FIG. 2, the process forming the subject of the present invention will be further shown on the ground of an example.

References 1a and 1b still indicate two tanks at regeneration step and at adsorbing step, respectively. Reference numeral 2 indicates a self-operated spool valve, reference numerals 3a and 3b indicate decompression enabling sensors, reference numeral 4 indicates a programmer unit, reference numerals 5a and 5b designate the pressure gauges for the respective tanks, reference numeral 6 designates a servo-operated spool valve, reference numerals 7a and 7b indicate the respective repressurization and decompression valves, reference numeral 8 designates an exhaust muffler, element 9 is an efficiency detector, reference numeral 10 is a feeder for the regenerating air (purge), reference numeral 11 designates an indicator for the flow rate of the regenerating air, while finally reference numeral 12 designates the shutter for the spool valve 6.

Let us examine by way of example how a classic scheme or diagram could be implemented for an adsorbing dehydration plant with heatless type of regeneration, as from FIG. 2, in which the three-way inversion valve 6 at the plant inlet is fitted with a pneumatic servomotor, so dimensioned that on receiving a signal A or B from said programmer 4 it changes over, shifting the flow into the adsorber 1a only when the bias or thrust on said shutter 12, as caused by the pressure differential between the two adsorbers, becomes less than that developed by said control B.

Thus, said control B closes said decompressive valve 7a and simultaneously requires the inversion of said spool valve 6.

However, such an inversion may occur only in that the purge passing through said feeder 10 has repressurized the adsorber 1a to such a value that the balance is established between the bias or thrust generated by control B on the inversion valve and that generated by the pressure differential on the shutter.

Therefore, it clearly appears that in a pneumatic control system thus implemented, by varying the pressure of control B or the active surface of the pneumatic servocontrol, it is possible to establish as desired at what repressurization level it is intended to effect and advance the inversion step.

Now, only upon inversion completion, a pointer (shown in hatch) integral with the valve shutter releases said sensor 3a and operates the opposite sensor 3b, causing the opening of said decompression valve 7b, which communicates said adsorber 1b with the atmosphere.

It should be particularly appreciated that the entire cycle is controlled by a simple programmer, to which only one function is requested, that is to provide or remove only one signal at equal intervals equal to the desired adsorbing time.

This expedient enables the achievement of the above listed advantages.

What I claim is:

1. A method for automating and optimizing the steps of the working cycle in adsorption gas dehydration plants of the heatless regeneration type, having two tanks storing an adsorbing medium and alternating with each other in the function of adsorption and regeneration of the adsorbing medium, with a sequence of steps sequentially comprising the regeneration of the adsorbing medium in a tank by a small amount of dried gas drawn from the other tank that is in adsorption step, the repressurization of that tank which was in regeneration step and which is, therefore, brought to the same pressure as that of the tank that was in adsorption step, the exchange or reversal of the functions of the two tanks, whereby that tank that was in regeneration step is changed to adsorption step, while the tank that was in adsorption step is decompressed and then regenerated, repeating the above disclosed sequence, in which repressurization valves are provided for opening and closing at suitable time the passage to atmosphere, and the sequence and duration of the several steps are controlled by a programmer, wherein said operations of repressurization and reversal are effected upon a single pulse or control signal simultaneously requesting that the repressurization and reversal steps to be carried out, and wherein said single control signal for the repressurization and reversal steps is supplied to the servocontrol of a two- or three-way valve having an unbalanced type of shutter, in which the changeover of the shutter occurs only when a balance is provided between the force generated by the servocontrol and the force generated by the pressure differential acting upon the shutter, that is the pressure differential between the two tanks.

2. A method according to claim 1, wherein the control supplied to said two- or three-way valve immediately causes the closing alone of the decompression valve for the tank that was in regeneration step, while the two- or three-way reversal valve will effect reversal only when a certain degree of balance is achieved between the pressures in the two tanks and determined by the power generated by the servocontrol.

* * * * *